US008954348B2

(12) United States Patent
Ricci et al.

(10) Patent No.: US 8,954,348 B2
(45) Date of Patent: Feb. 10, 2015

(54) ELECTRONICALLY ORDERING A PRODUCT (75) Inventors: Christopher P. Ricci, Dayton, OH (US); Howard L. Speight, Houston, TX (US)

(73) Assignee: Avaya Inc., Basking Ridge, NJ (US)

(*) Notice: Subject to any disclaimer, the term of this patent is extended or adjusted under 35 U.S.C. 154(b) by 1090 days.

(21) Appl. No.: 12/401,702

(22) Filed: Mar. 11, 2009

(65) Prior Publication Data

US 2010/0235252 A1 Sep. 16, 2010

(51) Int. Cl.
*G06Q 30/00* (2012.01)
*G06Q 30/06* (2012.01)

(52) U.S. Cl.
CPC ........ *G06Q 30/0603* (2013.01); *G06Q 30/0601* (2013.01)
USPC ........ 705/26.1; 705/26.2; 705/27.1; 705/27.2

(58) Field of Classification Search
None
See application file for complete search history.

(56) References Cited

U.S. PATENT DOCUMENTS

| 4,887,308 | A  | * | 12/1989 | Dutton ........................ 455/156.1 |
| 5,063,610 | A  |   | 11/1991 | Alwadish |
| 5,708,478 | A  | * | 1/1998  | Tognazzini .................... 348/552 |
| 5,991,737 | A  | * | 11/1999 | Chen ................................ 705/26 |
| 6,253,069 | B1 | * | 6/2001  | Mankovitz ................... 455/186.1 |
| 6,507,727 | B1 | * | 1/2003  | Henrick ....................... 455/3.06 |
| 6,578,047 | B1 | * | 6/2003  | Deguchi ................................ 1/1 |
| 7,221,902 | B2 |   | 5/2007  | Kopra et al. |
| 2010/0235252 | A1 | * | 9/2010 | Ricci et al. ....................... 705/26 |

OTHER PUBLICATIONS

EIA, "United States RBDS Standard", *Specification of the radio broadcast system (RBDS)*, (Apr. 9, 1998).

* cited by examiner

*Primary Examiner* — Fateh Obaid
(74) *Attorney, Agent, or Firm* — Sheridan Ross P.C.

(57) ABSTRACT

A system and method for distributing products where the product is shown, presented or advertised via a first communication method and a request to purchase that product is issued substantially simultaneously with the listening or viewing of the product. The request is then transmitted via a second communication method to a distributor who fills the order for such products.

13 Claims, 5 Drawing Sheets

ELECTRONICALLY ORDERING A PRODUCT

BACKGROUND

Figure 1:
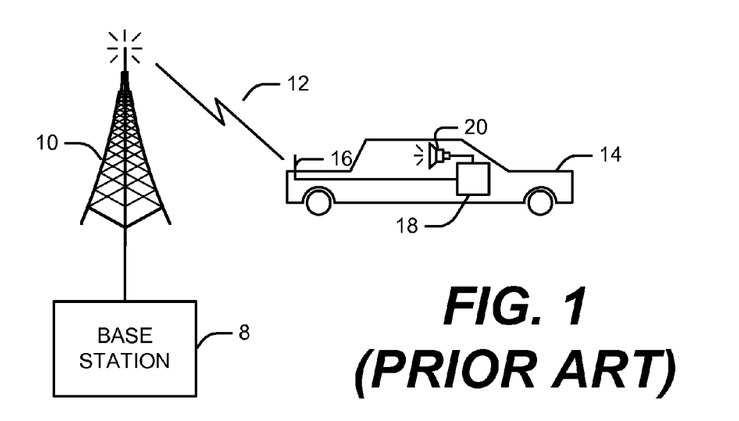
FIG. 1 shows a prior art radio transmission and automotive audio reception system.

Commercially available radio and television systems have been available for many years. FIG. 1 illustrates in its simplest form a transmitter/receiver combination which could be either a radio or television system, but will be assumed to be a radio system for this example. In such a system, a radio station 8 generates audio which can include voice, music, or other sounds (or video in the case of television). The audio is converted into electrical signals and is used to modulate a carrier wave 12 that is broadcast by a transmitter 10 such that the carrier wave is radiated into space.

In this example, the carrier wave 12 is then received by an antenna 16 disposed on an automobile 14. Assuming that the receiver 18, which is generally a car radio, is tuned to the frequency of the carrier wave 12, the carrier wave 12 is then demodulated by the receiver 18. Once demodulated, the above-described audio is audible from speakers 20 such that an occupant of the automobile 14 can hear the audio.

If an occupant of the automobile 14 decides to purchase the music being broadcast from the loud speaker 18, the user picks one of the conventional methods of purchasing that music. One conventional method is that of going to a music store where a compact disk ("CD") or cassette tape can be purchased. This involves driving to that store and purchasing that medium. Other methods are also available including mail order, telephone requests, and purchasing via the Internet.

In all of these methods in order to purchase a particular CD, the user typically determines who the artist is, the song title or CD title, and other purchase information in order to purchase the product. Often, this information is not readily available. Further, even if the user does know the title or artist, there can be multiple versions of the particular song, even by the same artist, and the user may not be able to differentiate and may ultimately receive a media that contains a version that is not to their liking.

This is also inherent in other advertising media. For example, when an advertisement for a product appears on television, there is generally no immediate means of purchasing that product. Providing phone numbers for immediate ordering is an attempt at accommodating a spontaneous purchaser, but it still requires an additional layer of communication.

SUMMARY

In general, in one aspect, the invention features a device for electronically ordering a product. The device includes a receiver to receive a signal. The signal includes a product signal modulated onto a carrier for a first period of time. The product signal embodies the product. The signal further includes a product-identifying signal modulated onto the carrier for the first period of time. The product-identifying signal identifies the product embodied by the product signal. The device further includes a decoder, collocated with the receiver, to decode the product-identifying signal and identify the product. The device further includes an initiator to initiate the purchase of the product when activated during a second period of time. The device further includes a transmitter activated by the initiator to transmit a purchase request for the product identified by the product-identifying signal.

Implementations of the invention may include one or more of the following. The second period of time may extend beyond the first period of time. The receiver and decoder may be contained within an automobile radio. The initiator and transmitter may be contained within a cellular telephone coupled to the automobile radio by a short-range communication technique. The product signal may be a signal of a type selected from the group consisting of an audio signal and a video signal. The product-identifying signal may uniquely identify the product. The device may include a memory containing an address to which the product is to be shipped and account information through which a price for the product is to be paid. The transmitter may include the address and account information in the purchase request. The memory may be physically separable from the rest of the device. The memory may be on a cellular telephone.

In general, in another aspect, the invention features a method for electronically ordering a product. The method includes receiving a signal at a receiver location. The signal includes a product signal modulated onto a carrier for a first period of time. The product signal embodies the product. The signal includes a product-identifying signal modulated onto the carrier for the first period of time. The product-identifying signal identifies the product embodied by the product signal. The method may include decoding the product-identifying signal at the receiver location and identifying the product at the receiver location. The method may further include initiating the purchase of the product during a second period of time by transmitting a purchase request for the product identified by the product-identifying signal.

In general, in another aspect, the invention features a method for reporting loyalty statistics. The method includes receiving a signal by a receiver. The signal includes a product signal modulated onto a carrier for a first period of time. The product signal embodies a product. The signal further includes a product-identifying signal modulated onto the carrier for the first period of time. The product-identifying signal identifies the product embodied by the product signal. The method further includes determining that as of a de-tune time within the first period of time the receiver is no longer receiving the signal. In response, the method identifies the product using the product-identifying signal and transmits the product identity.

Implementations of the invention may include one or more of the following. A further response may include transmitting the de-tune time. Identifying the product may include decoding the product-identifying signal. A further response may include transmitting demographic information about a user accessed from a memory device accessible to the radio. A further response may include transmitting a list of products embodied by the product signal while the receiver was receiving the signal. Transmitting may be accomplished substantially at the de-tune time.

In general, in another aspect, the invention features a method for electronically ordering a product. The method includes receiving a signal at a receiver location. The signal includes a product signal modulated onto a carrier for a first period of time. The product signal embodies the product. The method includes initiating the purchase of the product during a second period of time by transmitting a command to purchase the product and a segment of the product signal from the first period of time.

Implementations of the invention may include one or more of the following. The segment may begin at a marker included in the product signal. The marker may identify the beginning of a most-recognizable portion of the product signal. The method may further include storing the segment in a buffer during the first period of time. The method may further

DETAILED DESCRIPTION

A system for electronically ordering a product is disclosed that allows the spontaneous purchase of the product. The system uses identifiable portions of the sound or video that uniquely identify that product. The system allows for purchasing products without having to communicate through an additional communication device.

While the system retains utility within a wide variety of transmission devices and may be embodied in several different forms, it is advantageously employed in connection with a radio transmission device which transmits audio signals. Though this is the form of the preferred embodiment and will be described as such, this embodiment should be considered illustrative and not restrictive. One skilled in the art will realize that audio transmission of various sorts, video transmission, combined audio and visual transmission devices, inter alia, can employ the invention. Further, "products" as used herein shall mean any product whether it is a product being directly or indirectly advertised. An example of the latter is a medium containing the song or video that is being displayed such as a VHS cassette containing a movie, a DVD having audio and/or video or a CD. Further, "product signals" as used herein shall mean a signal that embodies a product. For example, an audio signal may embody a song, a book on tape, or an instructional program; a video signal may embody a television program or a movie; and a commercial or other advertisement may embody an advertised product.

Figure 2:
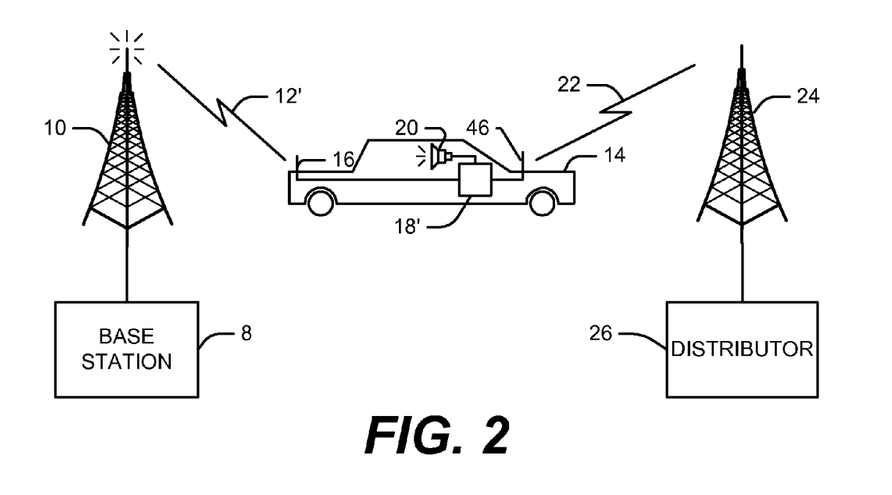
FIG. 2 shows a radio transmission and automotive audio reception system in accordance with the invention.

Referring now to FIG. 2 there is shown one embodiment of a transmission system employing the invention. Like the prior art transmission system of FIG. 1, the radio station 8 generates a carrier wave 12' that is modulated with the audio signal. In one embodiment, the modulation is identical to that of the prior art modulation. That is, carrier wave 12 and carrier wave 12' are substantially identical.

In one embodiment, the carrier wave 12' is further encoded with an identification code that uniquely identifies the product being described by the audio signal. For example, for any one particular song, a code is encoded on the carrier wave 12' in a manner that does not interfere with the demodulation of the audio signal itself. In one embodiment, the code can be selected to uniquely identify the product being described by the audio signal whether the product is a particular CD having the song being played or a product being advertised.

The carrier wave 12' is then broadcast from the transmitter 10.

The carrier wave 12' is received by the antenna 16 in the automobile 14. In one embodiment, the carrier wave 12' is then converted into audio signals within the radio 18', as previously described, and the radio 18' broadcasts the audio out of the speaker 20. In contrast to the prior art system of FIG. 1, in the preferred embodiment the radio 18' also decodes the identification code from the carrier wave 12'.

In one embodiment, once the identification code is decoded by the radio, the radio stores the code or displays information related to the code, as is describe later herein.

An occupant of the automobile 14 after hearing a song or a product described that the occupant wishes to purchase may selectively choose to purchase a medium containing that song or the product itself. One skilled in the art will recognize that the medium could be physical, in the case of a tangible product, or electronic, such as in the case of an mp3 file.

In one embodiment, the desire to purchase is manifested by transmitting a request signal 22. In one embodiment, the request signal is generated by depressing a button on the radio 18'. Various other methods of user interface are available and known in the art however.

In one embodiment, the request signal contains therein the identification code which identifies the product and origination information that identifies where the product is to be shipped or the download location. Optionally, the request can contain payment information or other information that may be desired by a distributor. In one embodiment, the payment and destination information are unitary in that when a credit card number is transmitted for payment the distributor ships the product to the address of record for the credit card's holder. One skilled in the art will realize that numerous procedural methods can be used to accomplish the transaction.

In one embodiment, the carrier wave 12' is not encoded with an identification code. In this embodiment, a portion of the audio being played at the time the request was initiated is included with the request. Upon receipt by a distributor, the portion is identified, if possible, and shipped.

In one embodiment, the request signal 22 is transmitted from the antenna 46 to an antenna 24 where it is converted from electromagnetic radiation in this case to an electrical signal passed to a distributor 26. In one embodiment, the antenna 46 is the same antenna 16 as was used to receive the carrier signal 12'. However, the system is easier to implement with a separate antenna 46 and use of antenna 46 provides for use of a frequency range for which antenna 16 is not necessarily optimized.

In one embodiment, the distributor 26 uses the request signal and particularly the identification code disposed thereon to identify which product has been requested. Once the order is placed the distributor transmits the product to the operator completing the transaction.

One skilled in the art will realize that the embodiments described above include numerous optional elements such as the radio 18' that need not be disposed in an automobile. The radio 18' may be a stationary system disposed in a house, or it may be a television which is portable or stationary, for example. Further, while the transmission from the base station 8 is shown using radio technology, which is the illustrated embodiment, transmission may be by some other means, such as streamed audio or video over the Internet. Further, the transmission method from the radio 18' is described here as being radio frequency transmission. While this is the illustrated form, numerous different methods of transmission may be used. For example, instead of radio frequency the radio 18' may be equipped with a cellular modem which places a cellular phone call to the distributor 26, thus placing the order. Further, there can be a hard link or data link (e.g. 3G, WiFi, Bluetooth) that periodically establishes an electronic link to the automobile such that the order is downloaded. One example of how this can be accomplished is by adding such a hard link to a gas nozzle such that when the gas nozzle is inserted into the fuel pipe, an electrical connection is made separately downloading from memory any orders that have been placed since the last fill-up. Thus, it is not important how the transmission is achieved, simply that it is achieved and that the order is placed from the same device or in proximity to the device that is broadcasting or otherwise displaying the audio or visual information being ordered.

Figure 3:
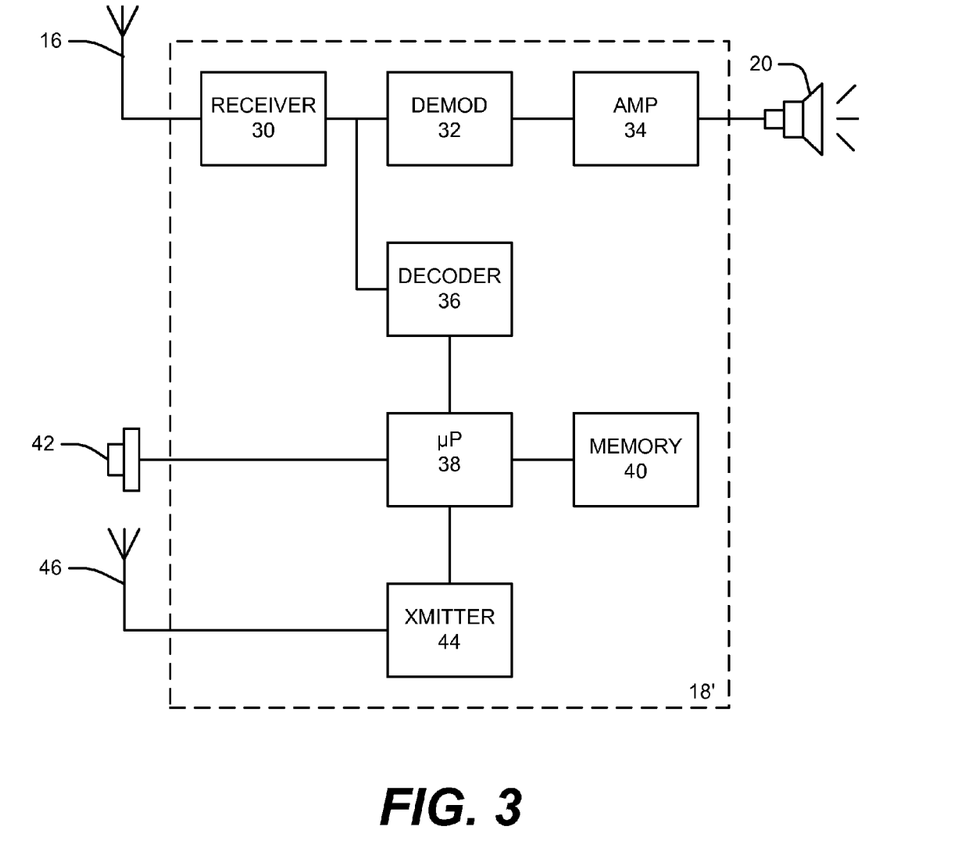
FIG. 3 shows a block diagram of the electrical system of a radio of the invention.

Referring now to FIG. 3 one embodiment of a block diagram of the radio 18' is shown. As previously described, in one embodiment, a signal is received at the antenna 16 and is converted into electrical signals which are passed into the receiver 30. In one embodiment, the electrical signals are then passed to a demodulator 32 which demodulates the signals. In one embodiment, the demodulated signal passes through an amplifier 34 and is broadcast from the loud speaker 20. The combination of antenna 16, receiver 30, demodulator 32, amplifier 34, and loudspeaker 20 is a simplified version of a conventional radio receiver. For the sake of illustration, frequency modulation ("FM") will be assumed though any form of modulated radio signal can be used.

In one embodiment, after the radio 18' receives the carrier signal 12' via the antenna 16 and the receiver 30, the demodulator 32 demodulates the signal as is known in the art to produce the audio signal. In one embodiment, the amplifier 34 then amplifies that audio signal such that the speaker 20 can present the audio to a local audience.

Simultaneously, in one embodiment, as the receiver 30 receives the signal via the antenna 16 the decoder 36 is receiving the electronic signal from the receiver 30. In one embodiment, the carrier signal 12' is encoded with the identification code representative of the product (e.g., the song being presented). In one embodiment, each product, song or version thereof is thus uniquely identifiable via the identification code. In one embodiment, the decoder 36 extracts or decodes the identification code and passes it to a microprocessor 38.

In one embodiment, the microprocessor 38 stores the code in memory 40. One skilled in the art will realize that the microprocessor 38 need not be a microprocessor at all but could be a discrete digital or analog circuit, an applications specific integrated circuit ("ASIC"), or numerous other circuit specific devices.

In one embodiment, each time a new song or other product is broadcast via the carrier signal 12' and received on the antenna 16, the decoder extracts the new identification code from the signal and passes it to the microprocessor 38 which then updates the memory 40.

In one embodiment, once a product is selected by a user, the user indicates the request for purchase, e.g. by pressing a button 42 on the radio 18'. One skilled in the art will recognize that though a physical button is illustrated, a soft button could also be used. In one embodiment, such a selection of the button 42 causes the microprocessor 38 to read the code stored in memory 40 and to pass that code to transmitter 34. The code is generally then encoded onto a second carrier signal 22 for radio transmission via the antenna 46 but may be transmitted as raw data or encrypted data via a hard link or cellular communication or other transmission method known in the art.

Figure 4A:
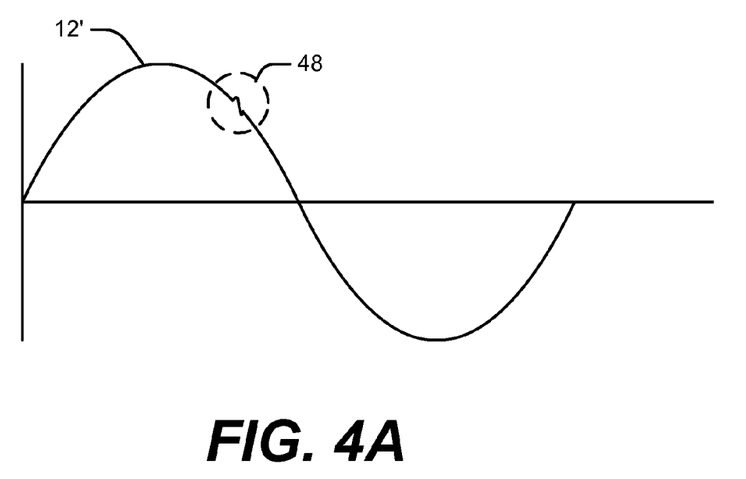
FIGS. 4A and 4B show a carrier wave modulated with a product signal and a product-identification signal.
Figure 4B:
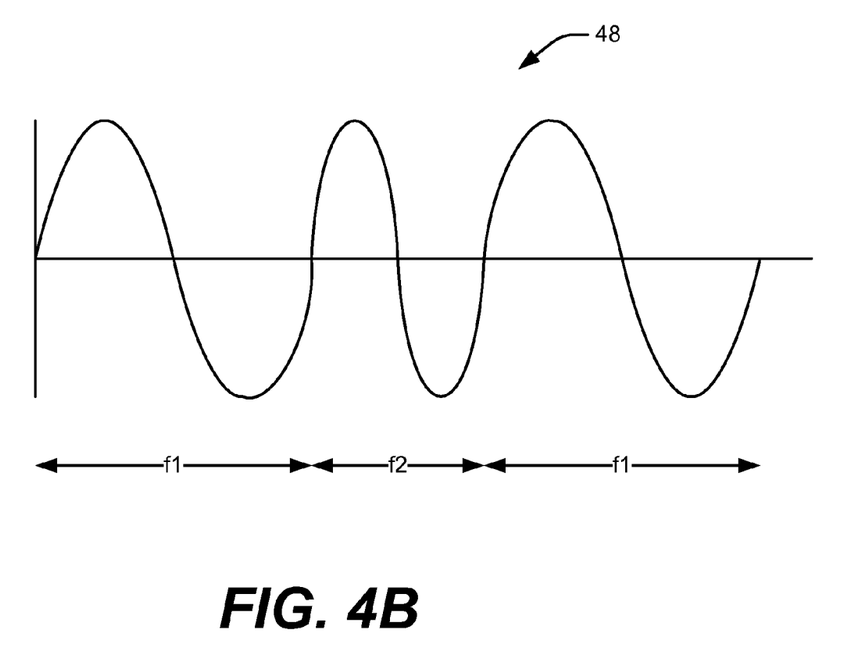

FIGS. 4A and 4B show one embodiment of encoding the signal with the code. The signal 12', which includes a product signal, such as the audio of a song being played, modulated onto a carrier, is shown having a product-identification signal 48 encoded therein. For simplicity and ease of illustration, FIG. 4A shows a product-identification signal 48 of short duration and small amplitude. Persons of ordinary skill would recognize that the duration of the product-identification signal 48 could be longer in duration, covering in some cases many cycles of the carrier signal 12'. Further, persons of ordinary skill will recognize that the relative amplitude of the product-identification signal 48 could be larger than that shown in FIG. 4A. In one embodiment, the demodulator 32 and the decoder 36 incorporate ways to extract the product-identification signal 48 from the carrier signal 12'. For example, in one embodiment, the product-identification signal 48 has a higher frequency than that of the modulated carrier signal 12'. In that case, a high-pass filter in the decoder rejects the modulated carrier signal 12' and allows the product-identification signal to be decoded. Similarly, a low-pass filter in the demodulator rejects the product-identification signal 48. In one embodiment, high-pass and low-pass filters are incorporated into the receiver 30 to extract the product-identification signal 48 from the modulated carrier signal 12', in which case the receiver has one output leading to the demodulator 32 and another output leading to the decoder 36, rather than the single output shown in FIG. 3.

Further, in some embodiments, additional steps are taken to facilitate detecting the product-identification signal 48 in the midst of the noise that typically accompanies radio broadcast signals. For example, in one embodiment the product-identification signal 48 represents a digital string in which a first portion is a beacon code and a second portion is a product code:

[beacon code] [product code]

In one embodiment, the beacon code is a known code that announces the beginning of the product-identification signal 48. In one embodiment, the beacon code is a previously-established string of bits. In one embodiment, the length of the string is established to produce a desired bit error rate in the decoding of the product-identification signal 48. The decoder 36, in one embodiment, uses correlative or autocorrelative techniques to detect the beacon code, thereby enhancing decoding of the product-identification signal 48.

Similarly, in one embodiment, the product code is repeated to improve the likelihood that the product code will be received correctly. For example, the complete product code may be transmitted multiple successive times following the beacon code. Alternatively, each bit of the product code may be retransmitted multiple times successively as the entire product code is transmitted. In one embodiment, the beacon code is transmitted repeatedly to improve the likelihood that the beacon code will be received correctly.

In one embodiment, frequency shift keying is used to generate the product-identification signal 48. In one embodiment, the product-identification signal 48 is encoded directly on the carrier signal 12'. In one embodiment, this is accomplished by summing the product-identification signal 48 with the carrier signal 12' at the transmitter just before the final amplification stage of the transmitter at the base station 8. The carrier signal 12' can be modulated as is normal for the method of transmission being used. That is, if the carrier signal 12 is normally frequency modulated, then the frequency shift coded information is layered on top of that FM transmission without detriment to the product-identification signal 48 carrying the identification code.

In one embodiment, the product-identification signal 48 is frequency shift keyed as previously stated. In such an encoding structure the product-identification signal 48 includes two or more different frequencies indicating indicative of a code. In a binary system such as that shown in FIG. 4B a first frequency f1 (representing a binary "0") is shown followed by a second frequency f2 (representing a binary "1") followed again by first frequency f1. This would be decoded to be representative of a code 010. One skilled in the art will realize that a binary system need not be used and that multiple based systems (i.e., base-n, where n>2) can be used, thus allowing more flexibility in the coding system. However a binary system is resistant to noise and is thus a preferred method.

Figure 5:
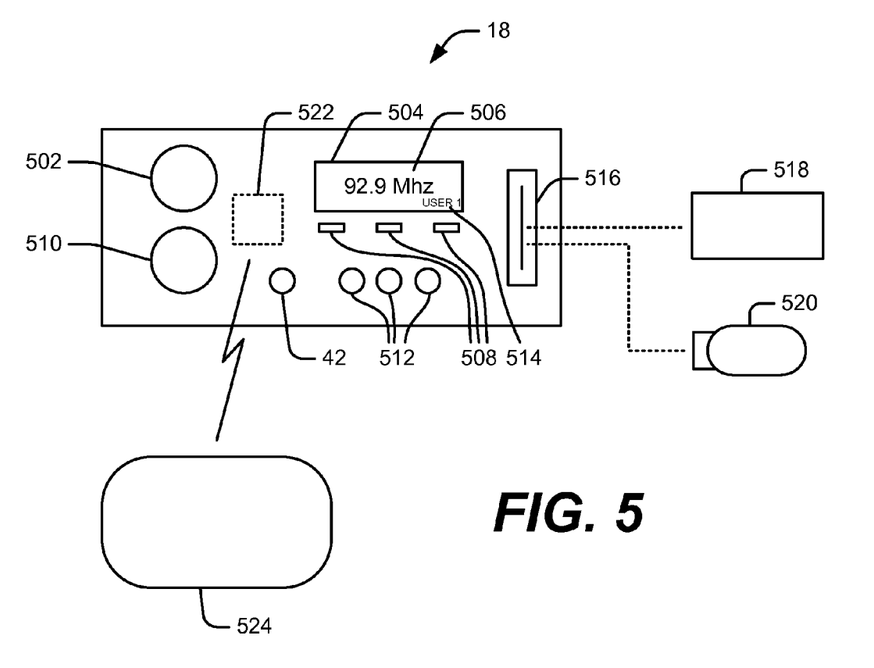
FIG. 5 shows a user interface of the radio according to FIG. 3.

FIG. 5 illustrates one embodiment of a user interface where the radio 18' is again designed for use in an automobile and again one skilled in the art will realize that this is simply an illustrative embodiment. In one embodiment, a tuning knob 502 is shown that adjusts the radio frequency to which the radio 18' is tuned. In one embodiment, the frequency 506 is shown on a liquid crystal display ("LCD") 504 as is common in the art. In one embodiment, radio preset buttons 508 are also illustrated for selecting determined radio frequencies. In one embodiment, a volume control knob 510 is also provided.

To this point the ordering system of the invention has been described without regard to how payment is made. Numerous methods of payment can be used ranging from a simple invoicing structure where once the media is ordered, it is shipped to the user along with an invoice. Then within a predetermined amount of time the user is required to pay that invoice. However, even with such a simple system of payment an address to which the media will be dispatched must be transmitted to the distributor. While it is possible to attach a keyboard or other input device to the radio 18', e.g. through a hardwired connection or a Bluetooth connection, it is not necessarily practical in most applications, particularly that of the illustrative embodiment in an automobile. Thus, in one embodiment, the user interface allows for inputting of such information and for storage of such information. Again inputting can be performed using many conventional methods including a keyboard but such information will be stored on a substantially permanent basis i.e. likely will not be changed until the car changes hands. Methods often employed for programming radios and/or telephones are more advisable. Thus, in one embodiment, the user may use the controls of the user interface either by using the tuning knob 502, the volume knob 510 or a combination of those with the preset buttons 508 in order to program a mailing address to the radio 18'. For example, the LCD 504 can display in a programming mode a sequence of alphanumeric characters that are chosen as desired. One skilled in the art will recognize that soft analogs of these controls could also be produced on a touch screen or other input device. Thus, if the address to be input is 1234 Pine Street then the first character is dialed in by the tuner 502 to be a 1 and that character is selected by pressing a button or combination of buttons which button or combination of buttons is chosen is of design choice by the manufacturer. In this case it could be the buy button 42. Thus the number 1 is placed into a character string and the next alphanumeric character is dialed. The sequence is repeated until the entire mailing address is input in which case possibly the buy button is selected multiple times to indicate termination or a second button is used. Other input methods may be used. In one embodiment, three mailing addresses, i.e. users, can be input though there is no restriction to the number only to that of practical use.

In one embodiment, the user buttons 512 are selected to indicate to whom the CD should be mailed an indication on the LCD such as user name or designator 514 is displayed along with the radio frequency 506. Thus, when a product is selected for purchase the user presses the buy button 42 and that product, a CD containing that song for example, is transmitted to the user's address as shown in the user display 504. It will be understood that the buy button could be eliminated and its function replaced by a combination of other buttons, such as the user buttons 512. In other words, a purchase command could be sent by, for example, simultaneously pressing all three user buttons 512.

Additionally, in one embodiment, the radio is equipped with a credit card reader 516 which accepts a credit card 518. Thus, once a buy request is issued by the buy button 42 the identification code of the product is transmitted as well as a credit card number associated with the credit card 518.

In one embodiment, the credit card 518 can be simply used for payment. In one embodiment, the credit card 518 can also be used to convey the user's mailing address by allowing the distributor access to the mailing address information of the credit card issuer, thereby eliminating a need to use the user buttons 512 to enter such information. Thus, when the buy request is issued and the credit card number are transmitted to the distributor, the distributor simply mails the product to the mailing address known to the credit card company that issued the credit card 518.

Alternatively, credit card information may be entered using the user buttons 512 as previously described. An input for a keyboard or a Bluetooth interface for a wireless keyboard could also be used to input this data. Further, a web interface could be used to input the data through, for example, a web page. The data would later be downloaded to the radio. Alternatively, the web interface could simply be referenced by the signal from the radio so that the distributor knows where to go to find the purchase information.

In one embodiment, the credit card reader 516 is replaced by a connector, such as a Universal Serial Bus ("USB") connector, into which a memory device 520 (e.g., a USB drive) may be inserted. In one embodiment, the memory device 520 stores mailing and credit card information for one or more users. In one embodiment, the radio 18' reads the mailing and credit card information from the memory device 520 and uses it in the purchasing process as described above. In one embodiment, the memory device 520 stores information for a single user. In one embodiment, the memory device 520 stores information for two or more users. In one embodiment, the radio 18' includes a credit card reader and a USB connector.

In one embodiment, the radio 18' includes a Bluetooth module 522 which allows communication with a Bluetooth-enabled device 524, such as a cellular telephone. In one embodiment, the device 524 contains mailing and credit card information for the device's owner. In one embodiment, the radio 18' reads the mailing and credit card information from the device 524 and uses it in the purchasing process as described above. In one embodiment in which the device 524 is a cellular telephone, the device 524 performs the functions of the transmitter 44 and the antenna 46 illustrated in FIG. 3 using the cellular telephone's cellular link, or if the cellular telephone has the capability, its wireless link. In one embodiment, the device 524 includes a processor and performs the some or all of the functions of the decoder 36, the microprocessor 38, and the memory 40. In one embodiment, the device 524 can be used as an input/output device for inputting or displaying information involved in a transaction.

As long as an identification code is transmitted and available to the radio 18', the radio 18' in this embodiment presents such information to the user. That is, if the identification information is such that the radio can translate the information then, in one embodiment, the LCD panel 504 can be used to display such information. For example, instead of posting the radio frequency 506, the radio 18' may scroll information specific to the product such as song title, CD title, and price. Likewise, if the product is a video that is being viewed on television for example, then the name of the video and the price may be displayed. If the product is an advertised product then the product name, manufacturer and price may be displayed. One skilled in the art will understand that this information can be changed depending upon the product.

In order for this information to be displayed by the radio, the identification code must be such that it is decipherable by the radio 18'. One possible system for achieving this is the radio containing a database of identification codes that is updated periodically. This can be accomplished using either the standard reception communication technology or the second communications method being used for purchasing products.

The standard reception communication technology is the radio frequency communications or hard link communication from which the audio or video signal is derived. An example of the latter is cable television. Continuing the example of radio, the radio could be adapted to listen for multiple transmissions simultaneously by incorporating a separate receiver tuned to a specific frequency. All transmissions on that frequency would then be used to update the database.

In one embodiment, at least part of the identification code is dedicated to this purpose and is translatable to alphanumeric characters that present the required information to the user. For example, the first part of the identification code could be a code that uniquely identifies the product that is useful to the distributor by translating the code with a database of such codes. The remaining portion of the identification code would then be textual conveying human-readable product-specific information such as that described above.

In addition to the product-specific information that can then be displayed on the radio 18', the station could include any other information that it wishes to present. For example, the station could mix in current weather advisories, or other advertising while a song is being played.

Further, if a product is not identifiable or available via this sales method, the distributor could send information back to the radio that transmitted the request using a similar structure. For this to be achieved, the radio would simply transmit the request including its own unique identification code. Thus, if a message is intended for one unique radio 18', it is identified by such code. The radio 18' then ignores all messages that are addressed to other radios.

Similarly, the radio 18' could also include an indicator as to whether or not the product is available via this sales method. A light-emitting diode or a message on the LCD, for example, could make this information available to the user.

Figure 6A:
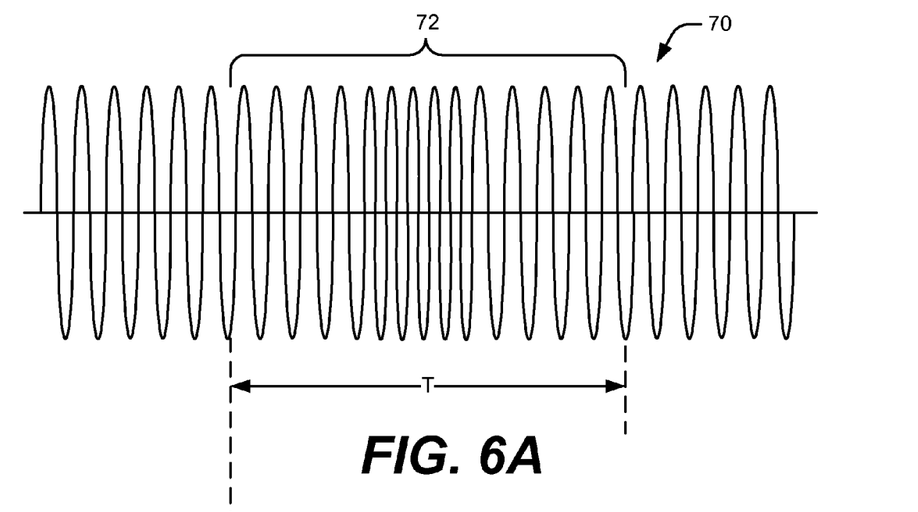
FIGS. 6A and 6B illustrate an alternative method of uniquely identifying the signal.
Figure 6B:
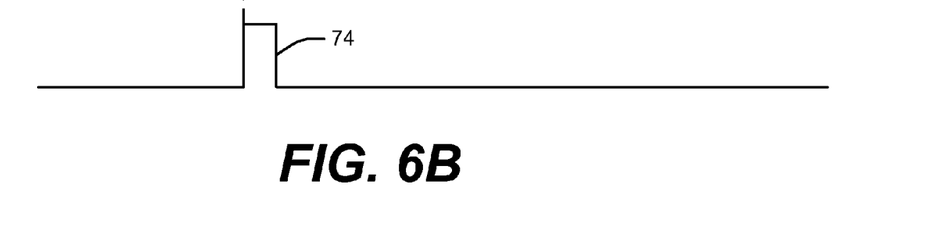

Referring now to FIGS. 6A and 6B there is shown an alternative method of determining what song has been selected. Assuming for the moment the song or other product does not have an identification code associated with it and a buy request has been issued, the music signal 70 being frequency modulated continues to be broadcast as is commonly known in the art.

Once the buy button 42 is depressed a pulse 74 is issued indicative to the previously described microprocessor that a purchase has been requested. At that moment, a predetermined portion 72 of the music signal 70 is captured and moved into memory. The predetermined portion 72 is measured as a period of time T. In this case when the transmission is made to the distributor that predetermined portion 72 is transmitted along with it the distributor must then determine which product has been requested. The period of time T must be sufficient to be indicative to the distributor which product it is but at the same time must account for memory constraints within the radio. In the preferred embodiment a five second time slice is used. In one embodiment, the music signal includes a marker, such as a high-frequency burst, an abrupt phase shift, or other such marker that indicates the beginning of the best time period of the music signal for recognition purposes. In one embodiment, the marker would be at the beginning of the best time period. In one embodiment, the marker would indicate the beginning of the best time period, for example, by being offset from that beginning by a known offset. In one embodiment, the microprocessor extracts the portion of the music signal beginning at the time indicated by the marker to send to the distributor. The distributor may then use human recognition or electronic signal comparison methods to determine the music being played or product being described at the time or a combination thereof. An example of an automated recognition program is SHAZAM, which receives a clip of a song and returns the title and artist.

Further, in the preferred embodiment, the period of time T is measured from prior to the pulse 74. Since a listener has already heard the information on the product or sufficient music for that listener to want to purchase that product, a sample from such a prior time could be more helpful to determine the product. To enable such a system, the audio signal is continuously buffered in memory or copied to memory in parallel with its audible transmission. Thus, issuance of the pulse 74, which is indicative of a request to buy, copies the buffered portion of the audio such that it can be transmitted to a distributor as previously described. A combination of prior and subsequent information could also be employed.

Depending upon the size of this buffer, this buffer can also be used to hold an entire song, for example. In this instance, the song could then be transferred to a recording medium such as a cassette tape, or simply stored in an mp3 file on a solid-state memory or hard disk. In this embodiment, the radio 18' includes sufficient memory and a button indication that the radio 18' should not overwrite this memory until rendered onto another medium.

To further enhance this system, the time, date, and station could be transmitted to the distributor. Again, this could be in combination with the segment of the audio signal. Assuming that the radio station makes its programming available, preferably electronically, a search of such programming using the time and date for the given station could determine what product is being requested.

In an alternative embodiment of the invention the radio 18' may be enabled for ratings determination. In this embodiment, the radio automatically monitors to which station the radio is tuned at all times during operation. The radio could also determine what duration of time each station is played, how often the station is changed, or any of various other pieces of information or statistical analyses.

Using the product determination methods described above, the radio could also provide information as to what was being played at the time a user changed the station. Further, using the user keys or information from credit card issuers, demographics for the user could be made available. All of this information can then be transmitted to a central site much as the information had been being transferred to a distributor. Thus, the ratings such as those used by ARBITRON® could be fully accomplished by the invention.

Further, the invention could be used to indicate not only download data to achieve a rating, but also could include like/dislike feature that can augment ratings. That is, if a person keys the "like button", but does not chose to buy the product, the rating could still be affected by this data.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for electronically ordering a product, the device comprising:
   a receiver to receive a signal, the signal including:
      a product signal modulated onto a carrier for a first period of time, the product signal embodying the product; and
      a product-identifying signal modulated onto the carrier for the first period of time, the product-identifying signal identifying the product embodied by the product signal;
   a decoder, collocated with the receiver, to decode the product-identifying signal and identify the product;
   an initiator to initiate the purchase of the product when activated during a second period of time; and
   a transmitter activated by the initiator to transmit a purchase request for the product identified by the product-identifying signal.

2. The device of claim 1 wherein:
   the second period of time extends beyond the first period of time.

3. The device of claim 1 wherein:
   the receiver and decoder are contained within an automobile radio; and
   the initiator and transmitter are contained within a cellular telephone coupled to the automobile radio by a short-range communication technique.

4. The device of claim 1 wherein:
   the product signal is a signal of a type selected from the group consisting of an audio signal and a video signal.

5. The device of claim 1 wherein the product-identifying signal uniquely identifies the product.

6. The device of claim 1 further comprising:
   a memory containing:
      an address to which the product is to be shipped; and
      account information through which a price for the product is to be paid;
   the transmitter including the address and account information in the purchase request.

7. The device of claim 6 wherein:
   the memory is physically separable from the rest of the device.

8. The device of claim 6 wherein:
   the memory is on a cellular telephone.

9. A method for electronically ordering a product, the method comprising:
   receiving a signal at a receiver location, the signal including:
      a product signal modulated onto a carrier for a first period of time, the product signal embodying the product; and
      a product-identifying signal modulated onto the carrier for the first period of time, the product-identifying signal identifying the product embodied by the product signal;
   decoding the product-identifying signal at the receiver location and identifying the product at the receiver location; and
   initiating the purchase of the product during a second period of time by transmitting a purchase request for the product identified by the product-identifying signal.

10. The method of claim 9 wherein:
    the second period of time extends beyond the first period of time.

11. The method of claim 9 wherein:
    receiving and decoding are performed by an automobile radio; and
    initiating and transmitting are performed by a cellular telephone coupled to the automobile radio by a short-range communication technique.

12. The method of claim 9 wherein:
    the product signal is a signal of a type selected from the group consisting of an audio signal and a video signal.

13. The method of claim 9 wherein the product-identifying signal uniquely identifies the product.

* * * * *